(12) United States Patent
Xu et al.

(10) Patent No.: US 10,075,240 B2
(45) Date of Patent: Sep. 11, 2018

(54) MULTI-RECEIVING-POINT GEOMETRICAL CENTER LOCATING SYSTEM AND METHOD FOR VISIBLE LIGHT COMMUNICATION

(71) Applicant: SOUTHEAST UNIVERSITY, Nanjing (CN)

(72) Inventors: Wei Xu, Nanjing (CN); Jia Wang, Nanjing (CN); Hua Zhang, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 15/518,146

(22) PCT Filed: Dec. 29, 2014

(86) PCT No.: PCT/CN2014/095243
§ 371 (c)(1),
(2) Date: Apr. 10, 2017

(87) PCT Pub. No.: WO2016/061892
PCT Pub. Date: Apr. 28, 2016

(65) Prior Publication Data
US 2017/0317746 A1    Nov. 2, 2017

(30) Foreign Application Priority Data
Oct. 23, 2014 (CN) .......................... 2014 1 0573357

(51) Int. Cl.
*H04B 10/60* (2013.01)
*H04B 10/116* (2013.01)
*G01S 5/16* (2006.01)
*H04B 10/079* (2013.01)
*H04B 10/50* (2013.01)
*H04B 10/564* (2013.01)
*G01S 1/70* (2006.01)

(52) U.S. Cl.
CPC .............. *H04B 10/116* (2013.01); *G01S 1/70* (2013.01); *G01S 5/16* (2013.01); *H04B 10/07955* (2013.01); *H04B 10/502* (2013.01); *H04B 10/564* (2013.01); *H04B 10/60* (2013.01)

(58) Field of Classification Search
CPC H04B 10/116; H04B 10/60; H04B 10/07955; H04B 10/564
See application file for complete search history.

(56) References Cited

U.S. PATENT DOCUMENTS 9,551,776 B2 * 1/2017 Jones ......................... G01S 1/70
2003/0052255 A1 * 3/2003 Hotta .................... G06F 3/0325
250/221

* cited by examiner

*Primary Examiner* — Dzung Tran
(74) *Attorney, Agent, or Firm* — CBM Patent Consulting, LLC

(57) ABSTRACT

It discloses a precise locating method of utilizing indoor visible light communication system, which belongs to the field of visible light communication; arranging any number of light emitting diode (LED) lamps indoors, setting the signal transmission power of each LED lamp to be the same and fixing the absolute location of each LED lamp, the terminal required for locating is equipped with several receiving devices, whose relative positions are known, then a position coordinate of the terminal can be obtained by determining the geometric center position of this set of receiving devices through calculating the measured light signal power of the receiving devices on the terminal.

3 Claims, 5 Drawing Sheets

MULTI-RECEIVING-POINT GEOMETRICAL CENTER LOCATING SYSTEM AND METHOD FOR VISIBLE LIGHT COMMUNICATION

This application is the U.S. national phase of International Application No. PCT/CN2014/095243 filed on Dec. 29, 2014 which designated the U.S. and claims priority to Chinese Application Nos. CN201410573357.9 filed on Oct. 23, 2016, the entire contents of each of which are hereby incorporated by reference.

TECHNICAL FIELD

The present invention relates to a multi-receiving-point geometrical center locating system and method in indoor visible light communication system, which belongs to the field of visible light communication.

BACKGROUND

With the development of outdoor locating, indoor locating is currently subjected to a wide concern, becoming an increasingly popular research field. Indoor locating mainly refers to the locating of indoor human or objects and provides some services based on locating such as private service, automatic robot control, mobile business, tracking service and navigation assistance. Until now, many researches based on locating have been proposed, and some techniques and products have used for indoor locating, for example radio frequency signal, wireless local area net (Wi-Fi), infrared, laser, ultrasound etc. Generally speaking, radio frequency signal is the main way of indoor locating, but accuracy of the wireless locating can only limit to meter level. Wi-Fi locating system has also been studied, but the results are all acquired by experiments. These locating techniques have limitations including, for example, low accuracy, existence of electromagnetic interference, requirement of additional equipment and low security etc.

To overcome these drawbacks, locating system based on visible light system (VLC) is widely spread. LED has a longer service circle, a high tolerance against humidity, low power consumption and a friendly relation with environment etc. And, LED lamp can modulate an electrical signal into an optical wave signal for transmitting at a very high speed. Based on these properties, in visible light communication system, LED lamp can not only be an illuminating equipment but also be a communication device. Many different locating algorithms, mainly geometrical methods, have been proposed in existing researches. Geometrical methods include two types: trilateral locating and triangle locating. Trilateral locating achieves locating by distance from multiple receiving points to the target. And the distance from receiving points to the target is mainly acquired by measuring received signal strength (RSS), time of arrival (TOA) and time difference of arrival (TDOA). Trilateral locating achieves locating by angle between multiple receiving points and the target. These locating methods generally have only one receiving device, i.e. the targeted object, whereas the conventional locating schema needs to exhaust and traversal resulting in a complicatedly calculating system.

SUMMARY

Invention purpose: in order to overcome insufficiency in prior art, the present invention provides a multi-receiving-point geometrical center locating system and method for visible light communication achieving an effect of high locating calculation and precise accuracy.

Technical Solution

A multi-receiving-point geometrical center locating system and method for visible light communication comprises steps of:

1) Arranging several LED lamps with same light transmission power as an optical signal transmitter, configuring the terminal required for locating with several light receiving devices as a signal receiver, the several light receiving devices is arranged as a regular polygon with the geometrical center point of the terminal being its center, the location relationship of the light receiving devices relative to the terminal is known:

$$\begin{cases} x_{R_i} = x + r\cos\left(\delta + \frac{2\pi}{N}(i-1)\right) \\ y_{R_i} = x + r\sin\left(\delta + \frac{2\pi}{N}(i-1)\right) \end{cases} i = 1, 2, \ldots, N$$

and the sum number of the LED lamps and light receiving devices arranged is greater than or equal to 4; wherein $x_{R_i}$, $y_{R_i}$ (i=1, 2, ..., N) are horizontal axis and vertical axis of the light receiving devices within a two-dimensional plane respectively, N is the number of the lighting devices; x, y are respectively horizontal axis and vertical axis of the terminal geometrical center within a two-dimensional plane; r is the distance from the center of the polygon to each vertex; establishing a polar coordinate with the center of the polygon being the polar point, and setting any one of the light receiving devices as a first light receiving device with $\delta$ being a polar coordinate angle of the first light receiving device;

2) Measuring the optical signal power received by each light receiving device to get a linear distance d from each LED lamp to each light receiving device, measuring a vertical distance h from the plane where the LED lamps are located to the plane where the light receiving devices are located, and then a horizontal distance D between each LED lamp and each light receiving device is obtained according to the principle of right triangle;

3) Obtaining the horizontal distance D from each LED lamp to each light receiving device through the coordinate relation of the LED lamps and the light receiving devices within the two-dimensional plane, and listing all the equation of the horizontal distance D obtained by coordinate relation equaling with the horizontal distance D obtained by step 2); wherein the horizontal axis and the vertical axis of the LED lamps within the two-dimensional plane are $x_{T_a}$, $y_{T_a}$ (a=1, 2, ..., M) and the number of the LED lamps is M; establishing a linear equation with terminal coordinates according to the location relation in step 1) and all the equations of the horizontal distance D, expressing the linear equation as a matrix, and then the horizontal axis and vertical axis for the geometrical center point of the light receiving devices, i.e. the coordinate for the geometrical center point of terminal required for locating, are obtained by calculating according to classical estimation method.

Further, the step 2) comprises steps of:

M LED lamps are arranged on the ceiling provided indoors: the first LED lamp $T_1$ ($x_{T_1}$, $y_{T_1}$), the second LED lamp $T_2$ ($x_{T_2}$, $y_{T_2}$), ... the Mth LED lamp $T_M$ ($x_{T_M}$, $y_{T_M}$), wherein $x_{T_a}$, $y_{T_a}$ (a=1, 2, ..., M) are respectively the horizontal axis and vertical axis of the LED lamps within the two-dimensional plane respectively; N light receiving devices arranged on the terminal, the light receiving devices being expressed as: the first light receiving device $R_1$ ($x_{R_1}$, $y_{R_1}$), the second light receiving device $R_2$ ($x_{R_2}$, $y_{R_2}$), ... the Nth light receiving device $R_N$ ($x_{R_N}$, $y_{R_N}$); $x_{R_i}$, $y_{R_i}$ (i=1, 2, ..., N);

21) Measuring the optical signal power Pr received by each light receiving device to get M×N received optical signal power;

22) Obtaining a linear distance from each LED lamp to each light receiving device according to a formula $$Pr = H(0) * Ptd;$$

wherein H(0) is channel DC gain, $$H(0) = \frac{n+1}{2\pi d^2} A\cos^n(\phi)\cos(\theta),$$

n is Lambert model order; A represents the area of light received by the surface of each light receiving device, $\phi$ the radiation angle of the LED lamps, $\theta$ is the incident angle of the light receiving devices; Pt is the signal transmission power of the LED lamps;

23) The horizontal distance D from each LED lamp to the light receiving devices can be obtained by $D=\sqrt{d^2-h^2}$.

Further, the step 3) comprises steps of:

31) Obtaining M×N horizontal distance D through the coordinate relation of the LED lamps and the light receiving devices, and listing an equation of M×N horizontal distance D obtained by coordinate relation equaling with M×N horizontal distance D obtained by step 2); establishing a linear equation with terminal coordinates according to the location relation in step 1) and all the equations of M×N horizontal distance D to obtain MN−1 equations, expressing MN−1 equations as a matrix:

$$Ax = b$$

wherein x is the location coordinate of the terminal;

$$A = \begin{bmatrix} \frac{x_{T_1} - x_{T_2}}{r} & \frac{y_{T_1} - y_{T_2}}{r} \\ \cdots & \\ \frac{x_{T_1} - x_{T_M}}{r} & \frac{y_{T_1} - y_{T_M}}{r} \\ \cos\left(\delta + \frac{2\pi}{N}\right) - \cos\delta & \sin\left(\delta + \frac{2\pi}{N}\right) - \sin\delta \\ \cdots & \\ \cos\left(\delta + \frac{2\pi}{N}\right) - \cos\delta + \frac{x_{T_1} - x_{T_M}}{r} & \sin\left(\delta + \frac{2\pi}{N}\right) - \sin\delta + \frac{y_{T_1} - y_{T_M}}{r} \\ \cdots & \\ \cos\left(\delta + \frac{2\pi}{N}(N-1)\right) - \cos\delta & \sin\left(\delta + \frac{2\pi}{N}(N-1)\right) - \sin\delta \\ \cdots & \\ \cos\left(\delta + \frac{2\pi}{N}(N-1)\right) - \cos\delta + \frac{x_{T_1} - x_{T_M}}{r} & \sin\left(\delta + \frac{2\pi}{N}(N-1)\right) - \sin\delta + \frac{y_{T_1} - y_{T_M}}{r} \end{bmatrix}_{(MN-1)\times 2}$$

$$b = \begin{bmatrix} \frac{R_{R_1T_2}^2 - R_{R_1T_1}^2 + x_{T_1}^2 - x_{T_2}^2 + y_{T_1}^2 - y_{T_2}^2}{2r} - (x_{T_1} - x_{T_2})\cos\delta - (y_{T_1} - y_{T_2})\sin\delta \\ \cdots \\ \frac{R_{R_1T_M}^2 - R_{R_1T_1}^2 + x_{T_1}^2 - x_{T_M}^2 + y_{T_1}^2 - y_{T_M}^2}{2r} - (x_{T_1} - x_{T_M})\cos\delta - (y_{T_1} - y_{T_M})\sin\delta \\ \frac{R_{R_2T_1}^2 - R_{R_1T_1}^2}{2r} - x_{T_1}\left(\cos\left(\delta + \frac{2\pi}{N}\right) - \cos\delta\right) - y_{T_1}\left(\sin\left(\delta + \frac{2\pi}{N}\right) - \sin\delta\right) \\ \cdots \\ \frac{R_{R_2T_M}^2 - R_{R_1T_1}^2 + x_{T_1}^2 - x_{T_M}^2 + y_{T_1}^2 - y_{T_M}^2}{2r} - \left(x_{T_1}\cos\delta - x_{T_M}\cos\left(\delta + \frac{2\pi}{N}\right)\right) - \left(y_{T_1}\sin\delta - y_{T_M}\sin\left(\delta + \frac{2\pi}{N}\right)\right) \\ \cdots \\ \frac{R_{R_2T_1}^2 - R_{R_1T_1}^2}{2r} - x_{T_1} * \left(\cos\left(\delta + \frac{2\pi}{N}(N-1)\right) - \cos\delta\right) - y_{T_1}\left(\sin\left(\delta + \frac{2\pi}{N}(N-1)\right) - \sin\delta\right) \\ \cdots \\ \frac{R_{R_NT_M}^2 - R_{R_1T_1}^2 + x_{T_1}^2 - x_{T_M}^2 + y_{T_1}^2 - y_{T_M}^2}{2r} - \left(x_{T_1}\cos\delta - x_{T_M}\cos\left(\delta + \frac{2\pi}{N}(N-1)\right)\right) - \left(y_{T_1}\sin\delta - y_{T_M}\sin\left(\delta + \frac{2\pi}{N}(N-1)\right)\right) \end{bmatrix}_{(MN-1)\times 1}$$

32) Estimating the geometrical center location of the light receiving devices through utilizing least squares criterion according to the formula below:

$$x=(A^T A)^{-1} A^T b$$

wherein $(\cdot)^T$ is the transpose of the matrix, and $(\cdot)^{-1}$ is the matrix inversion operator.

Beneficial Effects:

(1) The visible light positioning system concerned by the present invention is suited for the existing common mobile terminal devices such as a phone equipped with multiple cameras, a portable tablet computer etc. And these terminal devices are provided with a plurality of receiving equipment, if the relative location relation of these receiving equipment is known, the geometrical center location of this group of receiving devices, i.e. the coordinate for the geometrical center point of terminal required for locating, can be determined by calculating through measuring received signal power of this group of receiving equipment on the terminal. The locating method of the present invention offers a precise locating method based on least squares principle with respect to known features for the relative location of multiple points, which has a high locating calculation efficiency, precise accuracy and avoid employing traditional locating method featured by needing to exhaust and traversal and having a complicatedly calculating system.

(2) This locating method overcomes the condition where multiple receiving devices traditionally need an absolute location, instead utilizing relative location of the receiving devices to achieve locating.

(3) Once the locating system acquires a precise location of this geometrical center point, the absolute location for any one of the receiving devices on the terminal can be acquired through calculating the coordinate of this geometrical center location, it not only achieves locating the target but also achieves locating multiple receiving devices.

(4) This locating method is suited for multi-receiving with single-emitting and single-receiving with multi-emitting, also for multi-receiving with multi-emitting such as twice-receiving with twice-emitting etc.

(5) Obtaining target location through solving equations based on least squared principle has a high locating calculation efficiency and precise accuracy.

DETAILED DESCRIPTION

Figure 1:
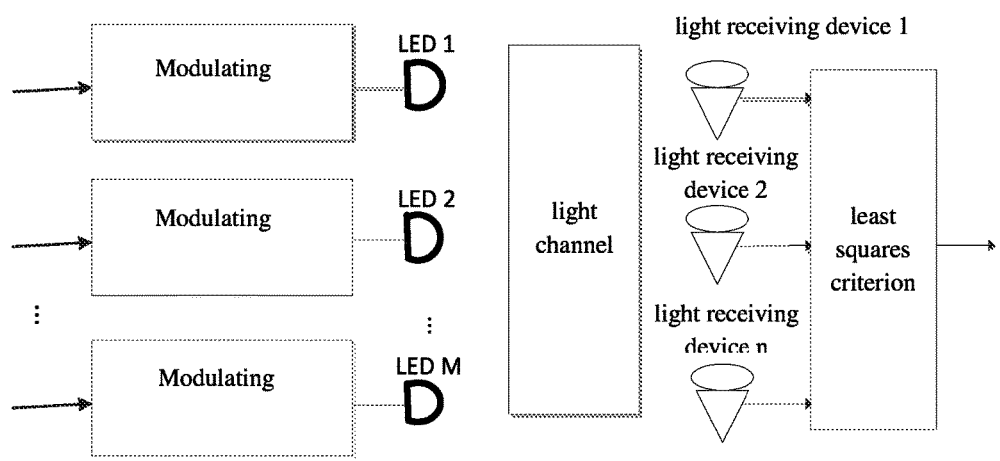
FIG. 1 is a block diagram of the method and system of the present invention.
Figure 2:
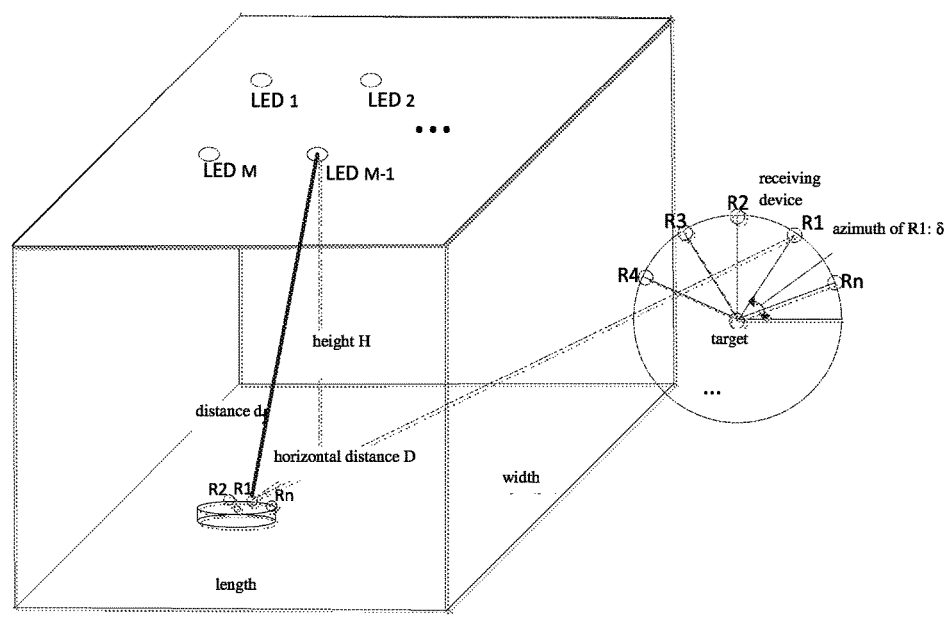
FIG. 2 is a general lay out diagram of the method and system of the present invention.

In conjunction with the drawings, the present invention will be further illustrated.

In FIGS. 1 to 5, the present invention discloses a multi-receiving-point geometrical center locating system and method for visible light communication, in an indoor visible light communication system, several LED lamps and one terminal carrying with several receiving devices are arranged for locating the terminal target. A multi-receiving-point geometrical center locating system and method for visible light communication comprises steps of:

1) Arranging several LED lamps with same light transmission power as an optical signal transmitter, configuring the terminal required for locating with several light receiving devices as a signal receiver, the several light receiving devices is arranged as a regular polygon with the geometrical center point of the terminal being its center, the location relationship of the light receiving devices relative to the terminal is known:

$$\begin{cases} x_{R_i} = x + r\cos\left(\delta + \frac{2\pi}{N}(i-1)\right) \\ y_{R_i} = x + r\sin\left(\delta + \frac{2\pi}{N}(i-1)\right) \end{cases} i = 1, 2, \ldots, N$$

and the sum number of the arranged LED lamps and the light receiving devices arranged is greater than or equal to 4, beneficial to locating estimation, wherein $x_{R_i}$, $y_{R_i}$ (i=1, 2, ..., N) are horizontal axis and vertical axis of the light receiving devices within a two-dimensional plane respectively, N is the number of the lighting devices; x, y are horizontal axis and vertical axis of the terminal geometrical center within a two-dimensional plane; r is the distance from the center of the polygon to each vertex; establishing a polar coordinate with the center of the polygon being the polar point, and setting any one of the light receiving devices as a first light receiving device with δ being a polar coordinate angle of the first light receiving device;

2) Measuring the optical signal power received by each light receiving device to get a linear distance d from each LED lamp to each light receiving device, measuring a vertical distance h from the plane where the LED lamps are located to the plane where the light receiving devices are located, and then a horizontal distance D between each LED lamp and each light receiving device is obtained according to the principle of right triangle;

3) Obtaining the horizontal distance D from each LED lamp to each light receiving device through the coordinate relation of the LED lamps and the light receiving devices within the two-dimensional plane, and listing all the equation of the horizontal distance D obtained by coordinate relation equaling with the horizontal distance D obtained by step 2); wherein the horizontal axis and the vertical axis of the LED lamps within the two-dimensional plane are $x_{T_a}$, $y_{T_a}$ (a=1, 2 ..., M) and the number of the LED lamps is M; establishing a linear equation with terminal coordinates according to the location relation in step 1) and all the equations of the horizontal distance D, expressing the linear equation as a matrix, and then the horizontal axis and vertical axis for the geometrical center point of the light receiving devices, i.e. the coordinate for the geometrical center point of terminal required for locating, are obtained by calculating according to classical estimation method.

Further, the step 2) comprises steps of:

M LED lamps are arranged on the ceiling provided indoors: the first LED lamp $T_1$ ($x_{T_1}$, $y_{T_1}$), the second LED lamp $T_2$ ($x_{T_2}$, $y_{T_2}$), . . . the Mth LED lamp $T_M$ ($x_{T_M}$, $y_{T_M}$), wherein $x_{T_a}$, $y_{T_a}$ (a=1, 2, . . . , M) are the horizontal axis and vertical axis of the LED lamps within the two-dimensional plane respectively; N light receiving devices arranged on the terminal, the light receiving devices being expressed as: the first light receiving device $R_1$ ($x_{R_1}$, $y_{R_1}$), the second light receiving device $R_2$ ($x_{R_2}$, $y_{R_2}$), ... the Nth light receiving device $R_N$ ($x_{R_N}$, $y_{R_N}$); $x_{R_i}$, $y_{R_i}$ (i=1, 2, ..., N);

21) Measuring the optical signal power Pr received by each light receiving device to get M×N received optical signal power;

22) Obtaining a linear distance from each LED lamp to each light receiving device according to a formula $$Pr = H(0) * Ptd;$$

$$A = \begin{bmatrix} \frac{x_{T_1} - x_{T_2}}{r} & \frac{y_{T_1} - y_{T_2}}{r} \\ \ldots & \\ \frac{x_{T_1} - x_{T_M}}{r} & \frac{y_{T_1} - y_{T_M}}{r} \\ \cos\left(\delta + \frac{2\pi}{N}\right) - \cos\delta & \sin\left(\delta + \frac{2\pi}{N}\right) - \sin\delta \\ \ldots & \\ \cos\left(\delta + \frac{2\pi}{N}\right) - \cos\delta + \frac{x_{T_1} - x_{T_M}}{r} & \sin\left(\delta + \frac{2\pi}{N}\right) - \sin\delta + \frac{y_{T_1} - y_{T_M}}{r} \\ \ldots & \\ \cos\left(\delta + \frac{2\pi}{N}(N-1)\right) - \cos\delta & \sin\left(\delta + \frac{2\pi}{N}(N-1)\right) - \sin\delta \\ \ldots & \\ \cos\left(\delta + \frac{2\pi}{N}(N-1)\right) - \cos\delta + \frac{x_{T_1} - x_{T_M}}{r} & \sin\left(\delta + \frac{2\pi}{N}(N-1)\right) - \sin\delta + \frac{y_{T_1} - y_{T_M}}{r} \end{bmatrix}_{(MN-1) \times 2}$$

$$b = \begin{bmatrix} \frac{R_{R_1 T_2}^2 - R_{R_1 T_1}^2 + x_{T_1}^2 - x_{T_2}^2 + y_{T_1}^2 - y_{T_2}^2}{2r} - (x_{T_1} - x_{T_2})\cos\delta - (y_{T_1} - y_{T_2})\sin\delta \\ \ldots \\ \frac{R_{R_1 T_M}^2 - R_{R_1 T_1}^2 + x_{T_1}^2 - x_{T_M}^2 + y_{T_1}^2 - y_{T_M}^2}{2r} - (x_{T_1} - x_{T_M})\cos\delta - (y_{T_1} - y_{T_M})\sin\delta \\ \frac{R_{R_2 T_1}^2 - R_{R_1 T_1}^2}{2r} - X_{T_1}\left(\cos\left(\delta + \frac{2\pi}{N}\right) - \cos\delta\right) - y_{T_1}\left(\sin\left(\delta + \frac{2\pi}{N}\right) - \sin\delta\right) \\ \ldots \\ \frac{R_{R_2 T_M}^2 - R_{R_1 T_1}^2 + x_{T_1}^2 - x_{T_M}^2 + y_{T_1}^2 - y_{T_M}^2}{2r} - \left(x_{T_1}\cos\delta - x_{T_M}\cos\left(\delta + \frac{2\pi}{N}\right)\right) - \left(y_{T_1}\sin\delta - y_{T_M}\sin\left(\delta + \frac{2\pi}{N}\right)\right) \\ \ldots \\ \frac{R_{R_2 T_1}^2 - R_{R_1 T_1}^2}{2r} - X_{T_1} * \left(\cos\left(\delta + \frac{2\pi}{N}(N-1)\right) - \cos\delta\right) - y_{T_1}\left(\sin\left(\delta + \frac{2\pi}{N}(N-1)\right) - \sin\delta\right) \\ \ldots \\ \frac{R_{R_N T_M}^2 - R_{R_1 T_1}^2 + x_{T_1}^2 - x_{T_M}^2 + y_{T_1}^2 - y_{T_M}^2}{2r} - \left(x_{T_1}\cos\delta - x_{T_M}\cos\left(\delta + \frac{2\pi}{N}(N-1)\right)\right) - \left(y_{T_1}\sin\delta - y_{T_M}\sin\left(\delta + \frac{2\pi}{N}(N-1)\right)\right) \end{bmatrix}_{(MN-1) \times 1}$$

wherein) H(0) is channel DC gain, $$H(0) = \frac{n+1}{2\pi d^2} A \cos^n(\phi)\cos(\theta),$$

n is Lambert model order; A represents the area of light received by the surface of each light receiving device, $\phi$ the radiation angle of the LED lamps, $\theta$ is the incident angle of the light receiving devices; Pt is the signal transmission power of the LED lamps;

23) The horizontal distance D from each LED lamp to the light receiving devices can be obtained by $D = \sqrt{d^2 - h^2}$.

Further, the step 3) comprises steps of:

31) Obtaining M×N horizontal distance D through the coordinate relation of the LED lamps and the light receiving devices, and listing an equation of M×N horizontal distance D obtained by coordinate relation equaling with M×N horizontal distance D obtained by step 2); establishing a linear equation with terminal coordinates according to the location relation in step 1) and all the equations of M×N horizontal distance D to obtain MN−1 equations, expressing MN−1 equations as a matrix:

$$Ax = b$$

wherein x is the location coordinate of the terminal;

32) Estimating the geometrical center location of the light receiving devices through utilizing least squares criterion according to the formula below:

$$x = (A^T A)^{-1} A^T b$$

wherein $(\bullet)^T$ is the transpose of the matrix, and $(\bullet)^{-1}$ is the matrix inversion operator.

Figure 3:
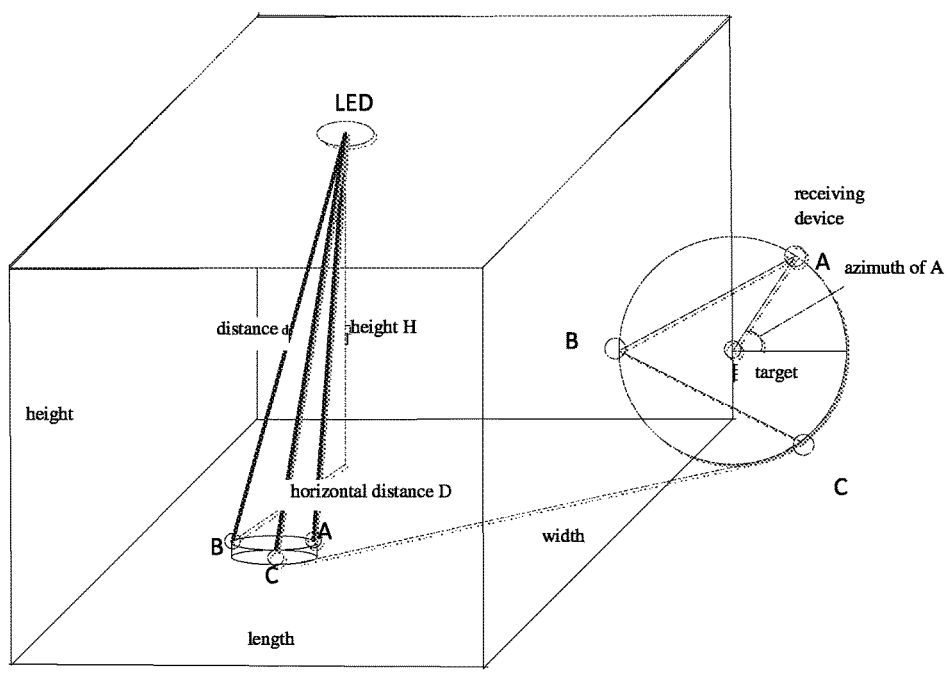
FIG. 3 is a layout diagram of the present invention with 1 LED lamp and 3 receiving devices.

The invention will be further described through simulation with reference to FIG. 3;

Simulation parameters are: arranging a LED lamp on the ceiling in a room sized by 6 m×6 m×2 m (length, width, height); establishing a Cartesian coordinate system with any one corner in the room being the origin: the coordinate ($x_{T_1}$, $y_{T_1}$) of LED mapped to the Cartesian coordinate is (3,3); the vertical distance h from the plane where the LED lamps located to the plane where the light receiving devices located is 2 m; the signal transmission power signal Pt of the LED lamp is 1 W; setting one terminal to be carrying with three light receiving devices B, C and E, as the relative location relation of the light receiving devices is known, arranging the three light receiving devices to be a positive triangle with the locating terminal target being the center, and the positive triangle is connected with a circle, the distance r form the center point of the positive triangle to each vertex is 0.2 m; the area A of three light receivers are all 1.0 square centimeters; polar coordinate δ:45 degree.

The relation of three light receiving devices relative to the terminal is:

$$\begin{cases} x_{R_i} = x + 0.2\cos\left(45° + \frac{2\pi}{3}(i-1)\right) \\ y_{R_i} = x + 0.2\sin\left(45° + \frac{2\pi}{3}(i-1)\right) \end{cases} i = 1, 2, \ldots, 3$$

Wherein $x_{R_i}$, $y_{R_i}$ (i=1,2,3) are the horizontal axis and vertical axis of the light receiving devices in the two-dimensional plane respectively; x, y are the horizontal axis and vertical axis of the terminal geometrical center in the two-dimensional plane 1) Measuring the optical signal power Pr received by each light receiving device to get 1×3 received optical signal power;

2) Obtaining the linear distance d from LED lamps to each light receiving devices according to the formula Pr=H(0)*Pt; wherein H(0) is channel DC gain, $$H(0) = \frac{n+1}{2\pi d^2} A\cos^n(\phi)\cos(\theta),$$

n is Lambert model order; A represents the area of light received by the surface of each light receiving device, φ the radiation angle of the LED lamps, θ is the incident angle of the light receiving devices;

3) The horizontal distance D from each LED lamp to the receiving devices can be obtained by $D=\sqrt{d^2-h^2}$. And the horizontal distance from the three devices B, C, E can be expressed as $D_B$, $D_C$, $D_E$.

Further, the step 3) comprises steps of:

31) Obtaining 1×3 horizontal distance D through the coordinate relation of the LED lamps and the light receiving devices, and listing an equation of 1×3 horizontal distance D obtained by coordinate relation equaling with 1×3 horizontal distance D obtained by step 2); establishing a linear equation with terminal coordinates according to the location relation in step 1) and the equations of 1×3 horizontal distance D to obtain MN−1=2 equations, expressing these two equations as a matrix:

$$Ax=b$$

wherein x is the location coordinate of the terminal;

$$A = 2\begin{bmatrix} 0.2\left(\cos\left(45° + \frac{2\pi}{3}\right)x - \cos 45°\right) & 0.2\left(\sin\left(45° + \frac{2\pi}{3}\right)x - \sin 45°\right) \\ 0.2\left(\cos\left(45° + \frac{4\pi}{3}\right)x - \cos 45°\right) & 0.2\left(\sin\left(45° + \frac{2\pi}{3}\right)x - \sin 45°\right) \end{bmatrix}$$

$$b = \begin{bmatrix} D_C^2 - D_B^2 - 2x_1 * 0.2\left(\cos 45° - \cos\left(45° + \frac{2\pi}{3}\right)x\right) - 2y_1 * 0.2\left(\sin 45° - \sin\left(45° + \frac{2\pi}{3}\right)\right) \\ D_E^2 - D_B^2 - 2x_1 * 0.2\left(\cos 45° - \cos\left(45° + \frac{4\pi}{3}\right)x\right) - 2y_1 * 0.2\left(\sin 45° - \sin\left(45° + \frac{4\pi}{3}\right)\right) \end{bmatrix}$$

According to:

$$x=(A^T A)^{-1} A^T b$$

the target location can be obtained through solving the matrix equation.

The average locating error in the whole room from simulation is 4.03 cm, the maximum locating error is 12.58 cm.

Figure 4:
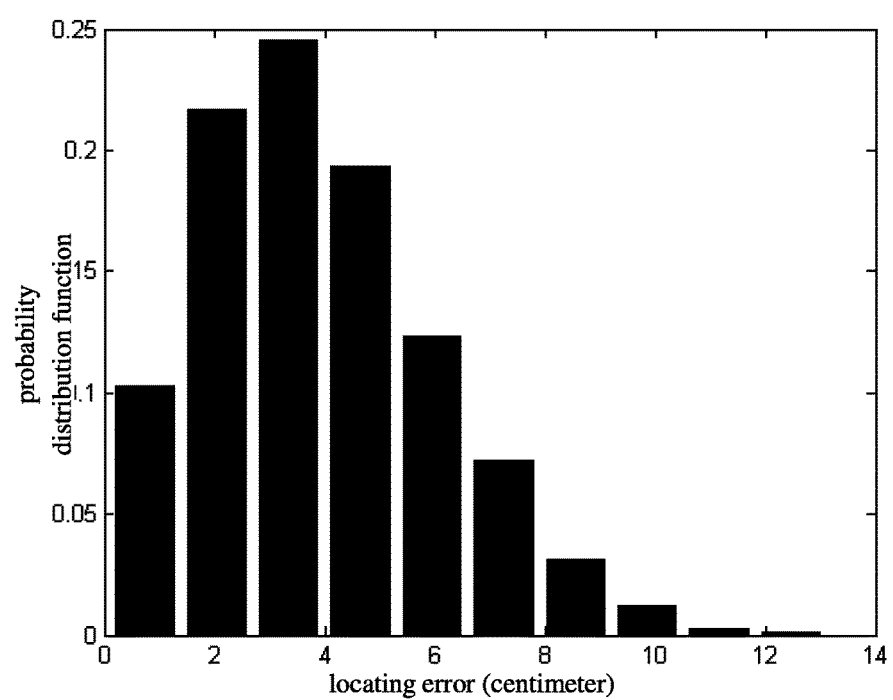
FIG. 4 is a histogram of locating error obtained when signal-to-noise ratio is 10 dB under the layout in FIG. 3.
Figure 5:
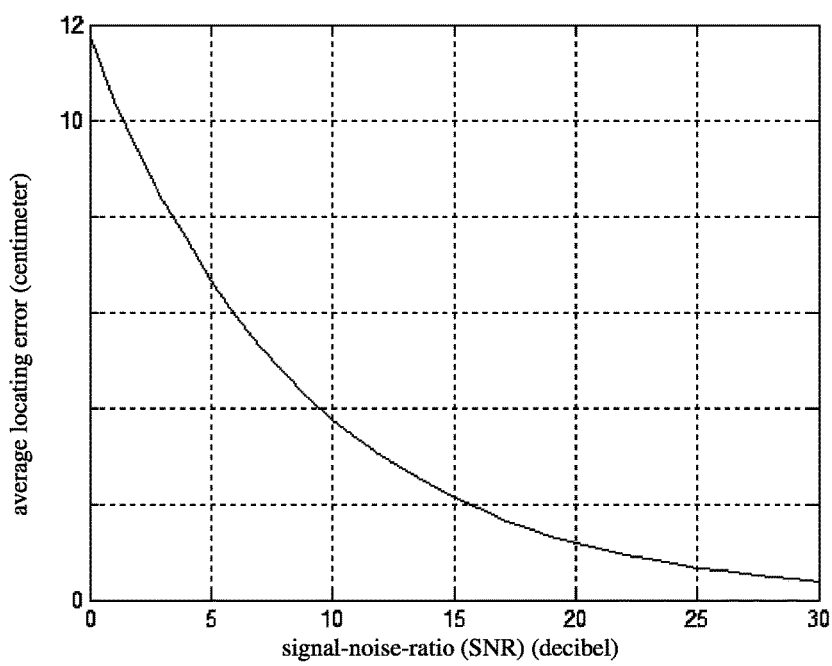
FIG. 5 is a relation view between average locating error and signal-to-noise under the layout in FIG. 3.

FIG. 4-5 illustrates performance simulation results through utilizing the locating method of the present invention with reference to FIG. 3.

FIG. 4 illustrates a histogram for the proportion of the locating error when in the range of 0-14 cm if signal-noiseratio is 10 dB under the condition in FIG. 3, it is shown that the proportion of the locating error in the range of 3-4 cm is maximum.

FIG. 5 illustrates the relation between average locating error and the 0-30 dB signal-noise-ratio under the condition in FIG. 3. It is known that the higher the signal-noise-ratio, the less the average error.

The preferred embodiments of the present invention are only described above, it should be noted that: for those in the art, several improvements and ornaments that should be considered within the protection scope of the present invention can also be made without departing from the principle of the present invention.

What is claimed is:

1. A method for assembling a LED device with a multi-receiving-point geometrical center locating system, the LED device comprising LED lamps, light receiving devices and a terminal wherein each LED lamp has an optical signal transmitter, each receiving device has a signal receiver and the terminal is a processor; wherein the LED device is assembled by the following steps:

1) installing multiple LED lamps on ceiling; arranging multiple light receiving devices as a regular polygon on the terminal surface; configuring the terminal for locating with the multiple light receiving devices; setting the geometrical center point of the terminal as a device center, the location of the multiple light receiving devices to the terminal is set as following:

$$\begin{cases} x_{R_i} = x + r\cos\left(\delta + \frac{2\pi}{N}(i-1)\right) \\ y_{R_i} = y + r\sin\left(\delta + \frac{2\pi}{N}(i-1)\right) \end{cases} i = 1, 2, \ldots, N$$

and the sum number of the LED lamps and the light receiving devices are set to be greater than or equal to 4;

wherein $x_{R_i}$, $y_{R_i}$ (i=1, 2, . . . , N) are horizontal axis and vertical axis of the light receiving devices within a two-dimensional plane respectively, N is the number of the lighting devices; x, y are horizontal axis and vertical axis of the terminal geometrical center within a two-dimensional plane; r is the distance from the center of the polygon to each vertex; establishing a polar coordinate with the center of the polygon being the polar point, and setting any one of the light receiving devices as a first light receiving device with δ being a polar coordinate angle of the first light receiving device;

2) measuring optical signal power transmitted by the optical signal transmitter received by the each light receiving device to get a linear distance d from each LED lamp to the each light receiving device; measuring a vertical distance h from the plane where the LED lamps are located to the plane where the light receiving devices are located, and then a horizontal distance D between each LED lamp and each light receiving device is obtained according to the principle of right triangle;

3) obtaining the horizontal distance D from each LED lamp to each light receiving device through the coordinate relation of the LED lamps and the light receiving devices within the two-dimensional plane, and listing all the equation of the horizontal distance D obtained by coordinate relation equaling with the horizontal distance D obtained by step 2); wherein the horizontal axis and the vertical axis of the LED lamps within the two-dimensional plane are $x_{T_a}$, $y_{T_a}$ (a=1, 2, . . . , M) and the number of the LED lamps is M; establishing a linear equation with terminal coordinates according to the location relation in step 1) and all the equations of the horizontal distance D, expressing the linear equation as a matrix, and then the horizontal axis and vertical axis for the geometrical center point of the light receiving devices, i.e. the coordinate for the geometrical center point of terminal required for locating, are obtained by calculating according to classical estimation method.

2. The method according to claim 1, characterized in that step 2) comprises the steps of:

M LED lamps are arranged on the ceiling: the first LED lamp $T_1$ ($x_{T_1}$, $y_{T_1}$), the second LED lamp $T_2$ ($x_{T_2}$, $y_{T_2}$), . . . the Mth LED lamp $T_M$ ($x_{T_M}$, $y_{T_M}$), wherein $x_{T_a}$, $y_{T_a}$ (a=1, 2, . . . , M) are the horizontal axis and vertical axis of the LED lamps within the two-dimensional plane respectively; N light receiving devices are arranged on the terminal, the light receiving devices being expressed as: the first light receiving device $R_1$ ($x_{R_1}$, $y_{R_1}$), the second light receiving device $R_2$ ($x_{R_2}$, $y_{R_2}$), . . . the Nth light receiving device $R_N$($x_{R_N}$, $y_{R_N}$); $x_{R_i}$, $y_{R_i}$ (i=1, 2, . . . , N);

21) measuring the optical signal power Pr received by each light receiving device to get M×N received optical signal power;

22) obtaining a linear distance from each LED lamp to each light receiving device according to formula $Pr=H(0)*Pt\ d;$ wherein H(0) is channel DC gain, $$H(0) = \frac{n+1}{2\pi d^2} A\cos^n(\phi)\cos(\theta),$$

n is Lambert model order; A represents the area of light received by the surface of each light receiving device, φ the radiation angle of the LED lamps, θ is the incident angle of the light receiving devices; Pt is the signal transmission power of the LED lamps;

23) the horizontal distance D from each LED lamp to the light receiving devices can be obtained by $D=\sqrt{d^2-h^2}$.

3. The method according to claim 2, characterized in that step 3) comprises the steps of:

31) obtaining M×N horizontal distance D through the coordinate relation of the LED lamps and the light receiving devices, and listing an equation of M×N horizontal distance D obtained by coordinate relation equaling with M×N horizontal distance D obtained by step 2); establishing a linear equation with terminal coordinates according to the location relation in step 1) and all the equations of M×N horizontal distance D to obtain MN−1 equations, expressing MN−1 equations as a matrix:

$Ax=b$ wherein x is the location coordinate of the terminal;

$$A = \begin{bmatrix} \frac{x_{T_1} - x_{T_2}}{r} & \frac{y_{T_1} - y_{T_2}}{r} \\ \cdots & \\ \frac{x_{T_1} - x_{T_M}}{r} & \frac{y_{T_1} - y_{T_M}}{r} \\ \cos\left(\delta + \frac{2\pi}{N}\right) - \cos\delta & \sin\left(\delta + \frac{2\pi}{N}\right) - \sin\delta \\ \cdots & \\ \cos\left(\delta + \frac{2\pi}{N}\right) - \cos\delta + \frac{x_{T_1} - x_{T_M}}{r} & \sin\left(\delta + \frac{2\pi}{N}\right) - \sin\delta + \frac{y_{T_1} - y_{T_M}}{r} \\ \cdots & \\ \cos\left(\delta + \frac{2\pi}{N}(N-1)\right) - \cos\delta & \sin\left(\delta + \frac{2\pi}{N}(N-1)\right) - \sin\delta \\ \cdots & \\ \cos\left(\delta + \frac{2\pi}{N}(N-1)\right) - \cos\delta + \frac{x_{T_1} - x_{T_M}}{r} & \sin\left(\delta + \frac{2\pi}{N}(N-1)\right) - \sin\delta + \frac{y_{T_1} - y_{T_M}}{r} \end{bmatrix}_{(MN-1)\times 2}$$

$$b = \begin{bmatrix} \frac{R_{R_1 T_2}^2 - R_{R_1 T_1}^2 + x_{T_1}^2 - x_{T_2}^2 + y_{T_1}^2 - y_{T_2}^2}{2r} - (x_{T_1} - x_{T_2})\cos\delta - (y_{T_1} - y_{T_2})\sin\delta \\ \cdots \\ \frac{R_{R_1 T_M}^2 - R_{R_1 T_1}^2 + x_{T_1}^2 - x_{T_M}^2 + y_{T_1}^2 - y_{T_M}^2}{2r} - (x_{T_1} - x_{T_M})\cos\delta - (y_{T_1} - y_{T_M})\sin\delta \\ \frac{R_{R_2 T_1}^2 - R_{R_1 T_1}^2}{2r} - X_{T_1}\left(\cos\left(\delta + \frac{2\pi}{N}\right) - \cos\delta\right) - y_{T_1}\left(\sin\left(\delta + \frac{2\pi}{N}\right) - \sin\delta\right) \\ \cdots \\ \frac{R_{R_2 T_M}^2 - R_{R_1 T_1}^2 + x_{T_1}^2 - x_{T_M}^2 + y_{T_1}^2 - y_{T_M}^2}{2r} - \left(x_{T_1}\cos\delta - x_{T_M}\cos\left(\delta + \frac{2\pi}{N}\right)\right) - \left(y_{T_1}\sin\delta - y_{T_M}\sin\left(\delta + \frac{2\pi}{N}\right)\right) \\ \cdots \\ \frac{R_{R_2 T_1}^2 - R_{R_1 T_1}^2}{2r} - X_{T_1} * \left(\cos\left(\delta + \frac{2\pi}{N}(N-1)\right) - \cos\delta\right) - y_{T_1}\left(\sin\left(\delta + \frac{2\pi}{N}(N-1)\right) - \sin\delta\right) \\ \cdots \\ \frac{R_{R_N T_M}^2 - R_{R_1 T_1}^2 + x_{T_1}^2 - x_{T_M}^2 + y_{T_1}^2 - y_{T_M}^2}{2r} - \left(x_{T_1}\cos\delta - x_{T_M}\cos\left(\delta + \frac{2\pi}{N}(N-1)\right)\right) - \left(y_{T_1}\sin\delta - y_{T_M}\sin\left(\delta + \frac{2\pi}{N}(N-1)\right)\right) \end{bmatrix}_{(MN-1)\times 1}$$

32) estimating the geometrical center location of the light receiving devices through utilizing least squares criterion according to the formula below:

$$x = (A^T A)^{-1} A^T b$$

wherein $(\bullet)^T$ is the transpose of the matrix, and $(\bullet)^{-1}$ is the matrix inversion operator.

* * * * *